Dec. 11, 1962 J. R. JOHNSON 3,067,861
POSITIVE ASSIST FOR LOADING ARTICLES TO A CHUCK
Filed Aug. 21, 1959 2 Sheets-Sheet 1
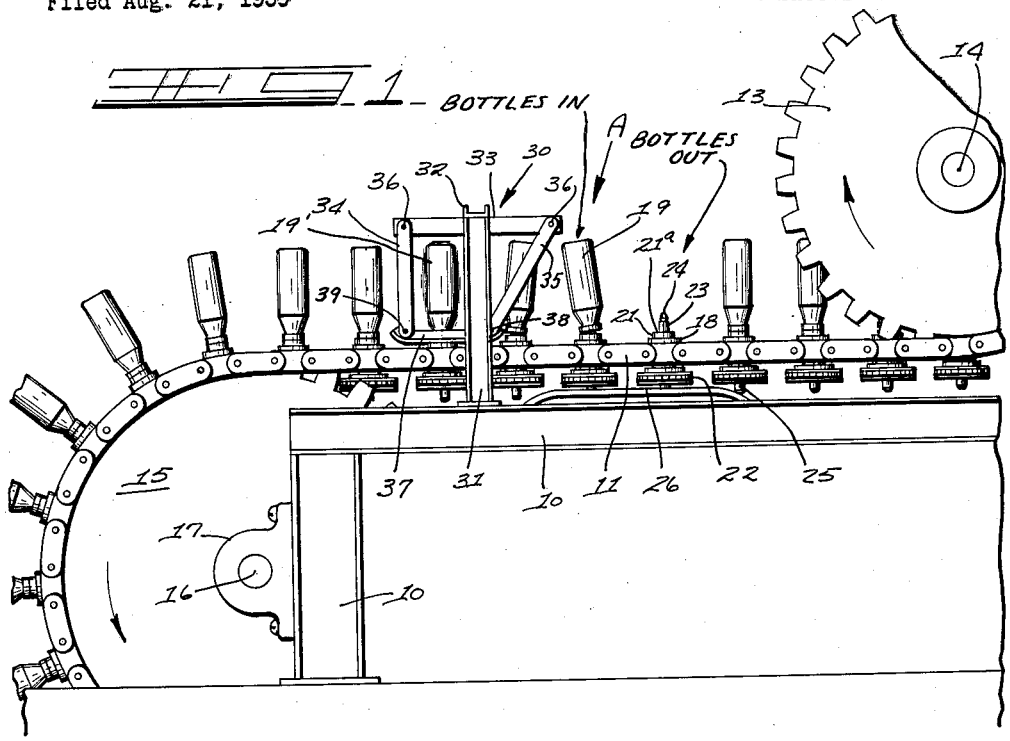
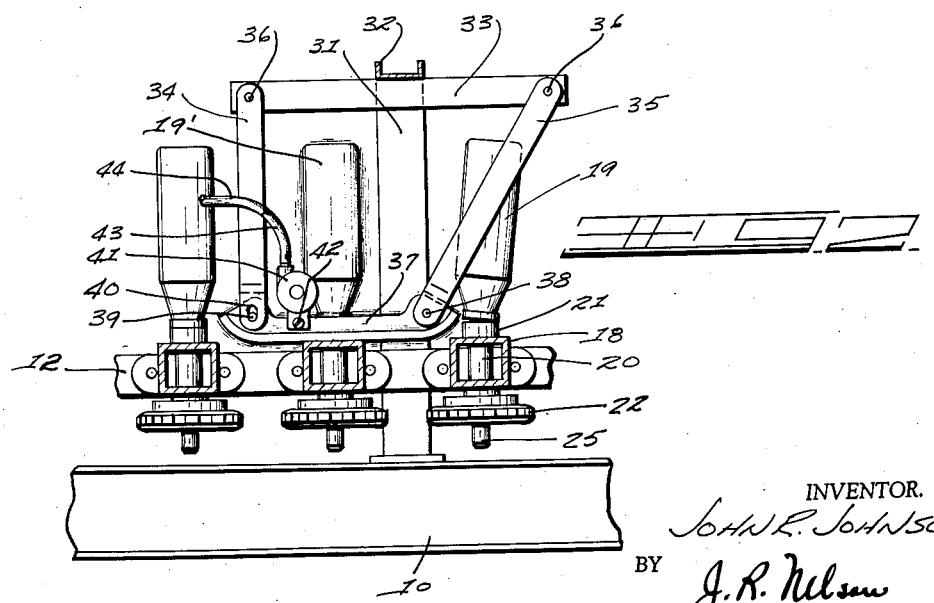
INVENTOR.
John R. Johnson
BY
J. R. Nelson
W. A. Schraich
ATTORNEYS

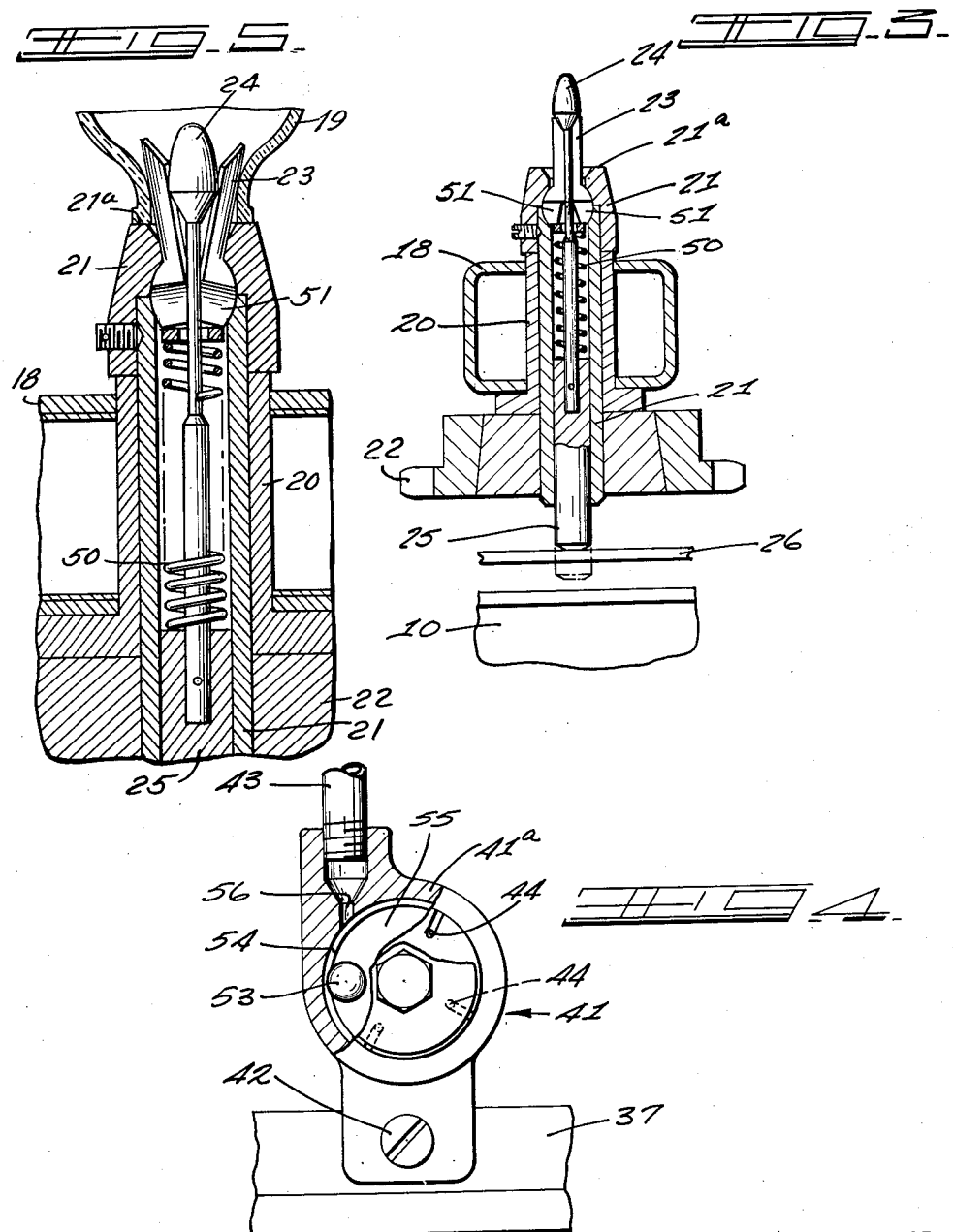

United States Patent Office 3,067,861
Patented Dec. 11, 1962

3,067,861
POSITIVE ASSIST FOR LOADING ARTICLES TO A CHUCK
John R. Johnson, Toledo, Ohio, assignor to Owens-Illinois Glass Company, a corporation of Ohio
Filed Aug. 21, 1959, Ser. No. 835,362
5 Claims. (Cl. 198—179)

This invention relates to apparatus for operating an article holding chuck upon loading to orient the article thereon and assure its being gripped for holding engagement by the chuck. In particular, the invention constitutes improved apparatus used in combination with chucks of the type disclosed in my U.S. Patent 2,882,061.

This chuck has been utilized in connection with a machine of the type disclosed in a copending application Serial No. 835,360, filed August 21, 1959, made jointly with Robert M. Smith. In a specific sense, this invention constitutes an improvement for loading articles to the chucks on that type machine. The chucks are mounted on cross pieces attached between respective links of a pair of parallel, spaced-apart, endless reaches of chain which extends throughout the machine to serve as a carriage for the chucks and articles gripped thereby. As is disclosed in detail in my mentioned patent, each chuck includes pivotal gripping jaws which may be expanded or contracted by axial movement of an actuator between the jaws. The actuator is normally held in position to expand the jaws by a spring. The jaws are contracted so as to be insertable into an opening of the article, such as at the neck opening of a bottle, by positive axial movement of the actuator against the spring. This latter-mentioned movement may be provided by carrying the chuck past a cam surface so as to reciprocate the plunger.

As indicated, the chuck is used on a machine to mount an article and carry it through various treatments. In so doing, the chucks become repeatedly and successively heated and cooled and may be brought into contact with various fluid materials for treating the article held by it. As a result, the chucks occasionally tend to close sluggishly and will not grip the bottle as securely as intended or may even fail to grip the bottle adequately to carry it through the process. This results in rejects and possible damage to the equipment. Also, irregularities of the interior surface of the article being gripped may contribute to insecurely loading it to the chuck.

It is, therefore, an object of this invention to overcome this problem by providing a combination of apparatus for assuring adequately gripping each article loaded onto the chuck.

A further object of the invention is the provision of apparatus which will positively assist loading articles thereon in proper orientation and aid operation of the chuck to secure a firm grip on the article.

Another object of the invention is to provide a vibrator apparatus operated to transmit vibrations to the chuck at the time its jaws are contracted and after an article is loaded thereon to vibrate the chuck and the article as the jaws are expanded to assure proper loading of each bottle.

Other objects and advantages will become apparent from the following description, taken in conjunction with the annexed sheets of drawings on which, by way of a preferred example, is illustrated one form of the invention and a practical adaptation thereof.

On the drawings:

FIG. 1 is a side elevational view of a machine carriage for the chucks as they are presented to a loading station and illustrates the apparatus of the invention.

FIG. 2 is a vertical sectional elevational view of a portion of the apparatus shown on FIG. 1 and illustrates the invention in use.

FIG. 3 is an enlarged sectional elevational view, showing the details of construction of the chucks that are on the machine carriage of FIG. 1.

FIG. 4 is an enlarged view, partially in section, showing the details of construction of the vibratory apparatus illustrated on FIG. 2.

FIG. 5 is a partial sectional view taken along line 5—5 on FIG. 1.

Referring to FIG. 1, a portion of the machine frame, indicated as 10, is shown which mounts a moveable carriage comprised of parallel, spaced-apart endless reaches of similar chains 11 and 12. The chains 11 and 12 are reeved about the machine each in running engagement with a plurality sets of similar sprockets, two of which are shown. The one set of sprockets 13 is rotatable on a bearing mounted horizontal shaft 14 and guides the chains around their underside and through a horizontal path at a loading station of the machine, indicated as A. Beyond the loading station, the chains 11 and 12 run over another set of sprockets 15 rotatably mounted by a horizontal shaft 16 running in end journal bearings 17 affixed to the machine frame 10.

As may be seen by brief reference to FIG. 2, a plurality of parallel cross pieces 18 are end connected between links of the chains 11 and 12 to extend transversely therebetween. The chucks are rotatably mounted through cross pieces 18 by a bushing 20. Through the bushing 20 is the rotatable body 21 of the chuck which has the pinion 22 affixed axially thereon on its outer end. Extending outwardly from the other end of body 21 are expansible jaws 23 which are expanded by movement therebetween of an axially reciprocable actuator having an enlarged end portion 24 (see FIGS. 1, 3 and 5). The actuator is extended to the position for contracting jaws 23 (as shown by empty chuck in FIGS. 1 and 3) by depressing the axial plunger 25 which extends through the center of pinion 22 and outwardly thereof. The plunger 25 is normally forced to its retracted position between the jaws by an internal spring, which expands the jaws 23 by the end enlargement 24 (FIG. 5). The force of spring 50 tends to shift plunger 25 and pin 24 downwardly in FIG. 3 and draw the enlarged end portion of pin 24 between the jaws 23 to expand them. The pin 24 and plunger 25 reciprocate along the central longitudinal axis between the jaws 23. The pivotal jaw formed by end portions 51 of the jaws has a centrally angularly slotted portion opening downwardly on FIG. 3 for permitting the jaws 23 to individually expand. When the jaws 23 expand, the spherical end portions 51 pivot about an imaginary center on the longitudinal axis for the jaws.

To contract the jaws 23 to the position shown in FIG. 3, the plunger 25 is shifted upwardly in FIG. 3 by force applied by cam 26 on the outer end of plunger 25 to further compress the spring 50 against the pivotal ball joint while extending the enlarged end portion 24 to permit the jaws 23 to contract and pivot the spherical end portions 51 of the jaws 23 about the imaginary pivot center toward each other to contract the jaws in position for loading a bottle, as is shown on FIG. 3. A bottle, such as 19 (FIG. 1), is loaded by inserting its neck opening over the enlarged end 24 of the pin and the contracted jaws 23 while plunger 25 is depressed and pin 24 is in its extended position. The end force on plunger 25 is thereafter released and the spring 50 shifts the plunger and the pin 24 to its retracted position so that the enlarged end portion of the pin is forced between the jaws 23 to expand them. As the jaws 23 are expanded, their outer surface engage the interior side of the bottle neck and exert a force thereagainst that is outwardly and downwardly (FIGS. 1 and 3). This force moves the top surface of the bottle neck downwardly to seat against annular shoulder 21a on the chuck body 21. Since the force is to be applied uniformly on each jaw for expanding them, the bottle is axially aligned along the center longitudinal axis of the jaw when it is firmly seated against the shoulder 21a. A more detailed description of the chuck is given in my U.S. Patent No. 2,882,061.

To load the chucks with an article, such as the bottles indicated at 19, a cam surface 26, as aforesaid, is mounted to the frame 10 by suitable mounting means in a fixed position in line with the path of movement of plungers 25. As the chucks reach the cam 26, their plungers 25 ride thereover and are depressed and jaws 23 contract to permit receiving the bottles 19 at their neck openings. The bottles are thus inserted in inverted fashion over the chuck jaws. The bottle is thus carried loosely in inverted fashion until plunger 25 rides off cam 26, whereupon the jaws are permitted to expand in the manner mentioned above (see FIG. 5) to firmly grip the interior of the bottle at its neck and pull it against the shoulder surface 21a of the body of the chuck. In so doing, the bottle will normally be gripped firmly and held in proper orientation on the chuck by seating on the shoulder 21a for receiving treatment during travel through the machine. This is the intended function of the chuck.

As was previously pointed out, however, the chucks may operate sluggishly so as to fail to grip the bottle as securely as intended or cast irregularities of the bottle surface being gripped may contribute to its not being properly gripped and oriented.

According to the present invention, the hereinafter described combination of elements are provided to positively assist operating the chucks and assure proper loading.

As seen on FIGS. 1 and 2, a frame 30 is supported on the machine frame by legs 31 and includes a horizontal lateral cross member 32 and a pair of horizontal longitudinally disposed beams 33 secured in spaced-apart, parallel relationship to the underside of the cross member 32, such as by welding. These beams, as will be apparent hereinafter, provide the place of attachment to the frame 30 of the mechanism for imparting vibration to the chucks. In this connection, one or more vibrating mechanisms may be supported by the frame. In the preferred form of the invention, as illustrated on the drawings, two such vibrating mechanisms are employed.

At the ends of each of the beams 33 are support arms 34 and 35, each pin connected at one end to their beams by pins 36. Two sets of these support arms are provided. Fastened at the other end of each set of arms 34 and 35 are vibratile members in the form of shoes 37 which are carried to successively engage the cross pieces 18 as the chains 11 and 12 carry them past the underside of the shoes. Each arm 35 is pin connected at 38 near the one end of a shoe 37 and each arm 34 is pin connected at 39 near the other end of a shoe 37. Both shoes 37 are mounted for limited vertical movement on their supports. As shown on FIG. 2 only, each of the pins 39 are fastened rigidly to their shoe 37 and are received in elongated slots 40 near the end of the arms 34. This slot allows limited vertical vibratory movement of the members 37. Also, it should be pointed out that the support arms 35 are each pivotally connected to the beams 33 and the one end of the shoes 37 by the pins 36 and 38 so that the shoes are slightly moveable by that mounting.

In relation to the cross pieces 18, the shoes 37 are supported by the arms arranged so as to avoid interference with the chucks and bottles thereon. Preferably, the support for the shoes, above described, are spaced apart longitudinally of the cross pieces 18 and near their opposite ends. On the upper side of each of the shoes 37 is a vibrator means 41 shown attached by bolt 42. One form of vibrator means which may be employed, as illustrated on FIGS. 2 and 4, is a compressed air driven type of vibrator device. An example of one such device is the Peterson "Vibrolator," sold by the Martin Engineering Company, Neponset, Illinois. The vibrator 41 is shown receiving compressed air at pipe 43 which is fed to the body 41a of the device through a venturi passage 56 to spin a steel ball 53 around in a race 54 in a cylindrical chamber 55 in the body at high speed. This generates an enormous number of powerful multi-directional vibrations. Air is exhausted at the outlets 44 at a metered rate. The vibrations thus set up are transmitted to the vibratile members 37 which in turn vibrate the cross pieces 18 they contact at the spaced points therealong. The chucks on the vibrated cross pieces in turn receive this vibration which positively assists operation of the chucks to assure their loading the bottles properly. Electrically actuated vibrators may likewise be used, as well as numerous other types of commercially available vibrators.

As may be seen on the drawings, the chucks are actuated for loading by the cam 26, and a bottle 19 is inserted over the jaws 23 of a chuck. The bottle then rides loosely on the chuck until its plunger 25 rides off the cam. At this point the chuck should operate to grip the bottle. As shown on FIG. 1, the seventh chuck from the right-hand side has failed to grip the bottle as securely as intended due to sluggish operation and thus that bottle is not properly aligned. As that chuck passes the shoes 37, however, the vibration transmitted frees any binding of the chuck closing mechanism and assures that it operates properly and, at the same time, properly orients the bottle on the chuck, as indicated at 19.

Various modifications may be resorted to within the spirit and scope of the appended claims.

I claim:

1. The combination of a plurality of parallel spaced-apart carriage elements, means in running engagement with these elements for moving them in a fixed path, a plurality of parallel cross pieces connected across said carriage elements, a plurality of article chucks mounted on said cross pieces and each having expandable jaws carried uppermost through said fixed path and operable between expanded and contracted positions for respectively gripping and releasing a hollow article internally adjacent an opening thereof, means mounted at a fixed location along said fixed path for engagement with each of said chucks to successively contract and expand their said jaws, a frame overlying said cross pieces at a point along said fixed path of the carriage elements and beyond the last-mentioned means, a longitudinally disposed shoe suspended from said frame and engaging the cross pieces successively during their movement, a vibrator means carried on said shoe and operated to vibrate said shoe whereby high speed vibrations are imparted to said chucks through their cross piece mountings as the latter engages the shoes during their movement.

2. The combination of a frame including support arms, a vibratile member mounted for limited vibratory movement on said support arms, a vibrator means connected for imparting high speed vibrations to said vibratile member, and a movable carriage means constructed and arranged to travel past said frame, said carriage means including parallel running carriage elements, parallel cross pieces connected between said carriage elements transversely thereof, and a plurality of article chucks mounted on said cross pieces, each chuck having expansible jaws carried uppermost past said frame and operable between expanded and contracted positions for gripping and releasing the hollow article internally adjacent an opening thereof, the cross pieces of said carriage means being successively brought into contact with said vibratile member, whereby high speed vibrations are transmitted to said chucks as their cross pieces contact the vibratile member.

3. In a machine having a carriage mounting article holding chucks and arranged for moving the chucks through a fixed path of travel, said carriage including spaced apart elements, the chucks being mounted on said elements and having expansible jaws operable to receive and grip articles internally to carry them for treatment, the improvement comprising in combination means for imparting high speed vibration to the chucks successively during a portion of their movement through said fixed path after they have received articles on the expansible jaws in order to assist securing the articles in position on the chucks prior to treatment, comprising vibratile means, a fixed frame along said path of travel and spaced from the carriage, said vibratile means being supported by said frame in position for said members to successively contact said spaced apart elements of the carriage during movement of the latter, and a vibrator means operatively connected to said vibratile means for vibrating the latter at high speed and imparting vibratory movement gainst said spaced apart elements.

4. In a machine having a carriage for articles holding chucks arranged to move the chucks through a fixed path of travel, said carriage including parallel spaced apart chains and parallel cross pieces between said chains, the chucks being mounted on said cross pieces and disposed perpendicular to the path of travel, the chucks having expandable members operable to receive and grip articles internally to carry them for treatment, the combination of a fixed frame spaced from the carriage at a point along its path of travel, a support member connected to the frame, a vibratile member attached to said support member and supported in position to successively engage said cross pieces of the carriage during movement of the latter, and a vibrator means operatively connected to said vibratile member for vibrating the latter at high speed and imparting a vibratory movement against an engaged cross piece whereby high speed vibrations are transmitted to the chucks carried by the cross piece.

5. In a machine having a carriage mounting article holding chucks and arranged for moving the chucks through a fixed path of travel, said carriage including spaced apart elements, the chucks being mounted on said elements, and having expansible jaws operable to receive and grip articles internally to carry them for treatment, the improvement comprising in combination means for imparting high speed vibration to the chucks successively during a portion of their movement through said fixed path after they have received articles on the expansible jaws in order to assist securing the articles in a position on the chucks prior to treatment thereof, comprising a fixed frame spaced from the carriage at a point along its said path of travel, a longitudinally disposed shoe attached to said frame and engageable with the carriage elements as the latter move past said frame, a vibrator means connected to said shoe, and means for operating said vibrator means to impart high speed vibrations to said shoe and the chucks on the carriage elements as the latter move successively past said shoe.

References Cited in the file of this patent
UNITED STATES PATENTS

| | | |
|---|---|---|
| 350,450 | Coleman | Jan. 25, 1887 |
| 1,220,703 | Stoffel | Mar. 27, 1917 |
| 1,304,362 | Panoulias | May 20, 1919 |
| 2,237,756 | Dostal | Apr. 8, 1941 |
| 2,319,474 | Price | May 18, 1943 |
| 2,882,061 | Johnson | Apr. 14, 1959 |